United States Patent
Guedes et al.

(10) Patent No.: US 10,429,856 B2
(45) Date of Patent: Oct. 1, 2019

(54) SAFE TAKEOFF SYSTEM

(71) Applicant: Embraer S.A., São José dos Campos (BR)

(72) Inventors: Patrice London Guedes, São José dos Campos (BR); Jose Roberto Ferreira De Camargo Clark Reis, São José dos Campos (BR); Nelson Barbosa, São José dos Campos (BR); Rubens Monteiro De Souza Junior, São José dos Campos (BR); Miriam Pitigliani, São José dos Campos (BR); Grace Rodrigues Lima, São José dos Campos (BR); Reinaldo Martins, São José dos Campos (BR); Nelson Seibert, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 15/698,337

(22) Filed: Sep. 7, 2017

(65) Prior Publication Data

US 2019/0072982 A1    Mar. 7, 2019

(51) Int. Cl.
| | | |
|---|---|---|
| *G05D 1/06* | (2006.01) | |
| *B64D 45/00* | (2006.01) | |
| *G01C 23/00* | (2006.01) | |
| *G05D 1/00* | (2006.01) | |

(52) U.S. Cl.
CPC .......... *G05D 1/0661* (2013.01); *B64D 45/00* (2013.01); *G01C 23/00* (2013.01); *G05D 1/0083* (2013.01)

(58) Field of Classification Search
None
See application file for complete search history.

(56) References Cited

U.S. PATENT DOCUMENTS

| | | | |
|---|---|---|---|
| 3,066,896 | A | 12/1962 | Schirtzinger |
| 4,490,802 | A | 12/1984 | Miller |
| 4,837,695 | A | 6/1989 | Baldwin |
| 4,843,554 | A | 6/1989 | Middleton et al. |
| 5,142,478 | A | 8/1992 | Crook |
| 5,499,025 | A | 3/1996 | Middleton et al. |
| 5,668,541 | A | 9/1997 | Coquin et al. |
| 6,527,225 | B1 | 3/2003 | Silder, Jr. et al. |
| 6,614,397 | B2 | 9/2003 | Pullen et al. |
| 7,720,579 | B2 | 5/2010 | Goodman et al. |
| 7,751,951 | B2 | 7/2010 | Pitard et al. |

(Continued)

FOREIGN PATENT DOCUMENTS

FR    2 650 101 A1    1/1991

OTHER PUBLICATIONS

George, Fred, "Pilot Report: Gulfstream G500," Aviation Week, BCA Business & Commercial Aviation, Oct. 19, 2016, 13 pages.

(Continued)

*Primary Examiner* — Thomas G Black
*Assistant Examiner* — Demetra R Smith-Stewart
(74) *Attorney, Agent, or Firm* — Nixon & Vanderhye P.C.

(57) ABSTRACT

An aircraft includes a safe takeoff system that automatically and autonomously rejects a takeoff if actual measured acceleration deviates from calculations based on pre-flight parameters and the speed of the aircraft traveling down the runway is within a safe speed range to guarantee a successful low inertia rejected takeoff.

29 Claims, 9 Drawing Sheets

(56) References Cited

U.S. PATENT DOCUMENTS

| | | |
|---|---|---|
| 7,885,734 B2 | 2/2011 | Lemoult et al. |
| 8,560,149 B1 | 10/2013 | Ganguli et al. |
| 9,164,505 B1 | 10/2015 | Peck et al. |
| 9,738,378 B1 | 8/2017 | Nikolic et al. |
| 10,202,204 B1* | 2/2019 | Daidzic ................. B64D 45/08 |
| 2004/0054448 A1 | 3/2004 | Ito |
| 2007/0124034 A1 | 5/2007 | Pitard et al. |
| 2008/0154445 A1 | 6/2008 | Goodman et al. |
| 2008/0215198 A1 | 9/2008 | Richards |
| 2008/0258014 A1 | 10/2008 | McCoskey et al. |
| 2010/0094488 A1 | 4/2010 | Michal et al. |
| 2010/0241294 A1 | 9/2010 | Virelizier et al. |
| 2011/0040431 A1* | 2/2011 | Griffith ................. G05D 1/0661 701/15 |
| 2011/0118909 A1 | 5/2011 | Ishihara et al. |
| 2011/0184623 A1 | 7/2011 | De Boer |
| 2013/0085629 A1* | 4/2013 | Washington ............ B64C 13/18 701/15 |
| 2013/0211636 A1 | 8/2013 | Martins et al. |
| 2014/0225753 A1* | 8/2014 | Conrardy ............. G08G 5/0047 340/972 |
| 2014/0239126 A1 | 8/2014 | Hara |
| 2014/0257603 A1* | 9/2014 | McKeown ............. B64D 45/00 701/16 |
| 2015/0005982 A1 | 1/2015 | Muthukumar |
| 2015/0102166 A1 | 4/2015 | Moser et al. |
| 2015/0120098 A1 | 4/2015 | Catalfamo et al. |
| 2015/0254988 A1* | 9/2015 | Wang ................... G05D 1/0214 701/3 |
| 2019/0056740 A1* | 2/2019 | Westphal ............. G05D 1/0202 |

OTHER PUBLICATIONS

Advisory Circular, "Takeoff Safety Training Aid," U.S. Department of Transportation, Federal Aviation Administration, AC No. 120-62, Sep. 12, 1994, 10 pages.

* cited by examiner

Schematic of the data evaluation and System Decision Process

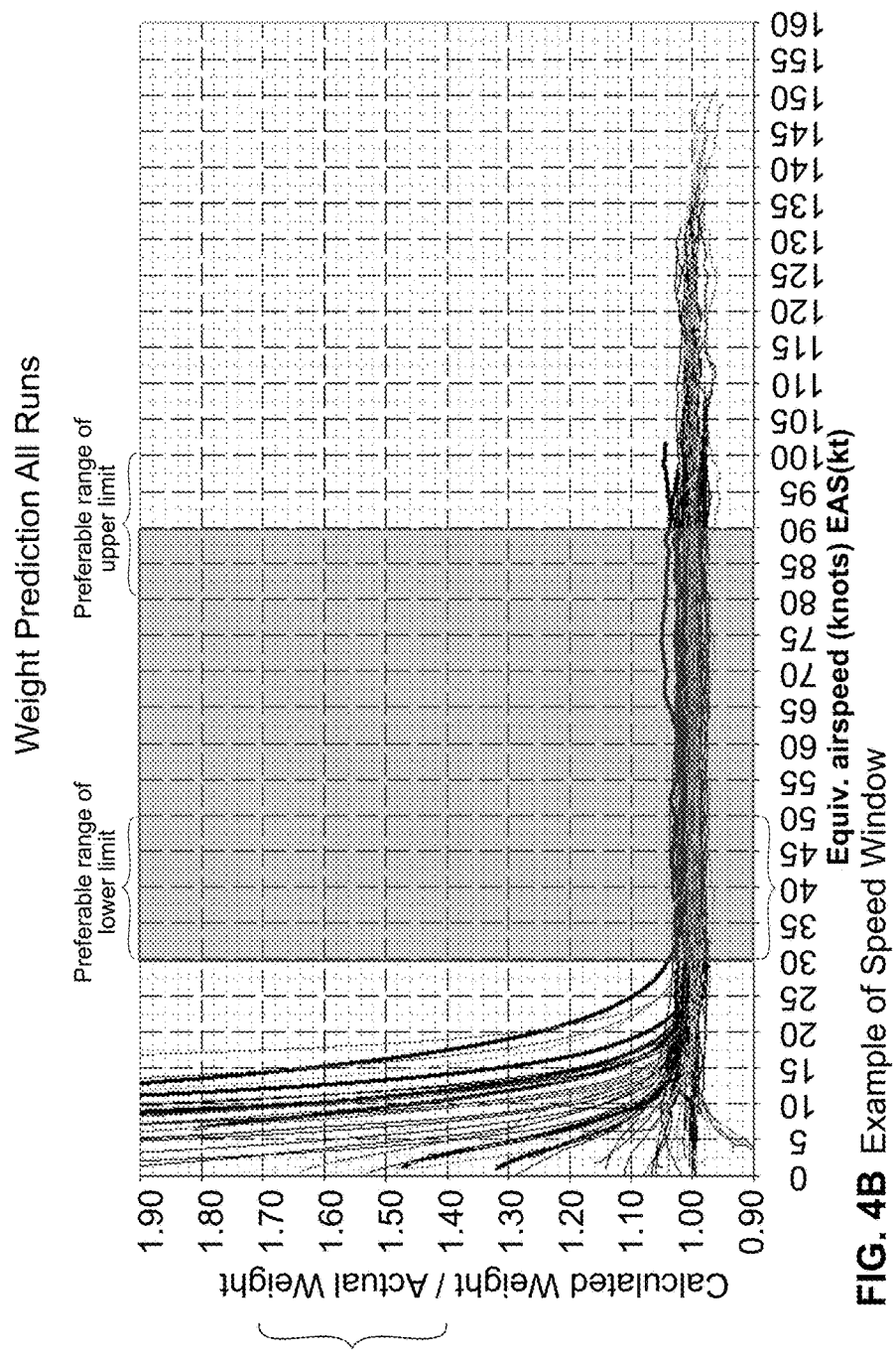
FIG. 4B Example of Speed Window

SAFE TAKEOFF SYSTEM

CROSS-REFERENCE TO RELATED APPLICATIONS

None.

STATEMENT REGARDING FEDERALLY SPONSORED RESEARCH OR DEVELOPMENT

None.

FIELD

The technology herein relates to aircraft performance and automation, and more particularly to systems and methods for ensuring safe takeoff in the event incorrect takeoff information is inputted to a flight computer. In still more detail, the technology herein causes the aircraft to automatically and autonomously reject a takeoff if actual measured acceleration deviates from calculations based on pre-flight parameters and the speed of the aircraft traveling down the runway is within a safe speed range to guarantee a successful low inertia rejected takeoff.

BACKGROUND & SUMMARY

Commercial airlines perform tens of millions of takeoffs annually. Only a very small percentage of attempted takeoffs result in rejected takeoffs (RTO's). Pilots decide to execute RTO's due to a variety of factors including engine failure, wheel/tire failure, incorrect pre-flight configuration, indicator/warning lights, lack of crew coordination, and bird strikes. An RTO at a low speed rarely results in any adverse consequences. High-speed RTO's, on the other hand, can potentially cause the airplane to overrun the end of the runway, with catastrophic consequences. See Federal Aviation Administration, "Pilot Guide to Takeoff Safety", retrieved from https://www.faa.gov/other_visit/aviation_industry/airline_operators/training/media/takeoff_safety.pdf A recurring issue in aviation is errors in aircraft dispatch and/or the incorrect pilot inputs of takeoff parameters. Before takeoff, the flight control computer is typically initialized with certain parameters pertinent to the takeoff. These inputs include weight, configuration (flap position), thrust and takeoff speeds ($V_1$, $V_R$ and $V_2$). Since thrust and V speeds are critical to proper takeoff, errors in inputting these parameters can lead to serious aircraft accidents. The table below presented some accidents related to wrong takeoff data:

| Fatalities | Date | Type | Registration | Operator | Location |
|---|---|---|---|---|---|
| 271 | 25-May-1979 | DC-10-10 | N110AA | A Airlines | USA |
| 248 | 27-Mar-1977 | Boeing 747 | PH-BUF | KLM | Spain |
| 154 | 16-Aug-1987 | DC-9-82 | N312RC | Northwest Airlines | USA |
| 154 | 20-Aug-2008 | DC-9-82 | EC-HFP | Spanair | Spain |
| 141 | 25-Dec-2003 | Boeing 727 | 3X-GDO | UTA | Benin |
| 130 | 3-Jun-1962 | Boeing 707 | F-BHSM | Air France | France |
| 110 | 8-Oct-2001 | DC-9-87 | SE-DMA | SAS | Italy |
| 83 | 31-Oct-2000 | Boeing 747 | 9V-SPK | Singapore Airlines | Taiwan |
| 82 | 28-Aug-1993 | Yakov 40 | 87995 | Tajikistan Airlines | Tajikistan |

Such types of accidents are often consequences of a lower aircraft capability to accelerate and/or climb. A particularly terrible example where an accident was related to wrong takeoff configuration (and overweight) is the case of Union des Transports Africains de Guinée (UTA) Flight 141 which departed Conakry, Guinea for a scheduled flight to Beirut, Lebanon on Christmas Day, Dec. 25, 2003. The Boeing 727 departed at 10:07 carrying 86 passengers and a crew of 10. It arrived at Cotonou at 12:25 where nine passengers disembarked. A total of 63 people had checked in at the Cotonou airport check-in-desk. Ten others boarded from a flight that had arrived from another airport. Passenger boarding and baggage loading took place in a climate of great confusion. The plane was full and it is thought that there were more passengers aboard the plane than had officially checked in.

The flight crew began pre-flight checklist at 13:47 and were cleared to roll at 13:52. Passengers were still standing in the aisles at that time. At 13:58:01, the thrust lever was advanced, 14 seconds later the brakes were released and the Boeing 727 began accelerating down the runway. 46 seconds after the brakes were released, the captained announced $V_1$ and $V_R$ speeds. At that moment the aircraft was 1620 meters down the runway at a speed of 137 knots.

The co-pilot pulled back on the control column to rotate the plane at VR. This action initially had no effect on the airplane's angle of attack. The Captain called "Rotate, rotate", and the co-pilot pulled back harder. The angle of attack only increased slowly. The pilot did not command an RTO. Seven seconds later, at a speed of 148 knots and 2100 meters down the runway, the nose just slowly rose. The 727 barely climbed away from the ground, causing its main undercarriage to strike localizer antennas at the end of the runway and strike a 3-meter-high small building housing radio equipment. The plane continued beyond the end of the runway, smashing through a concrete airport boundary fence and slamming into the beach. The fuselage broke into several pieces. At least 144 people died in the crash.

The official explanation of the crash was that the aircraft's weight exceeded its maximum weight capacity. The accident resulted from difficulty that the flight crew encountered in performing rotation with an overloaded airplane whose forward center of gravity was unknown to them.

To avoid such disasters, the preflight operational engineer typically carefully calculates the takeoff weight (TOW) of the aircraft based on a weight & balance spreadsheet. The spreadsheet and/or calculation presents some statistical simplifications which decrease the level of accuracy. An example is the passenger estimated weight that can significantly differ from the real one. The same can be related to the baggage and other cargo.

The takeoff "Vspeeds" ($V_1$, $V_R$, $V_2$) evaluation is based on the takeoff weight. Therefore, if the weight is wrong, so are the takeoff speeds. It is also possible to incorrectly calculate the V-speeds even if the weight determination is right. Even if the operational engineer's calculations are all correct, the pilot and/or dispatch inputs into the flight computer can be wrong.

Today, the only way to confirm if the data is right is to recalculate and/or re-check the input data. This is of course not a failure-proof processes.

Some in the past have proposed ways to monitor if the data are correct and, in case of a detected error, alert the pilot to make some action. But since the pilot workload is higher at takeoff, such proposals must somehow assure that there is enough runway remaining to stop the aircraft without a runway excursion (overrun) in case the pilot decides to abort the takeoff.

Although such prior techniques propose a way to check if there are some errors on dispatch, they all introduce a higher pilot workload, since the pilot must understand the situation and must decide to make the first action to abort the takeoff.

BRIEF DESCRIPTION OF THE DRAWINGS

The following detailed description of exemplary non-limiting illustrative embodiments is to be read in conjunction with the drawings, of which:

FIG. 4B illustrates a non-limiting example of a safe speed window with preferable upper and lower speed ranges.

DETAILED DESCRIPTION OF EXAMPLE NON-LIMITING EMBODIMENTS

Figure 1:
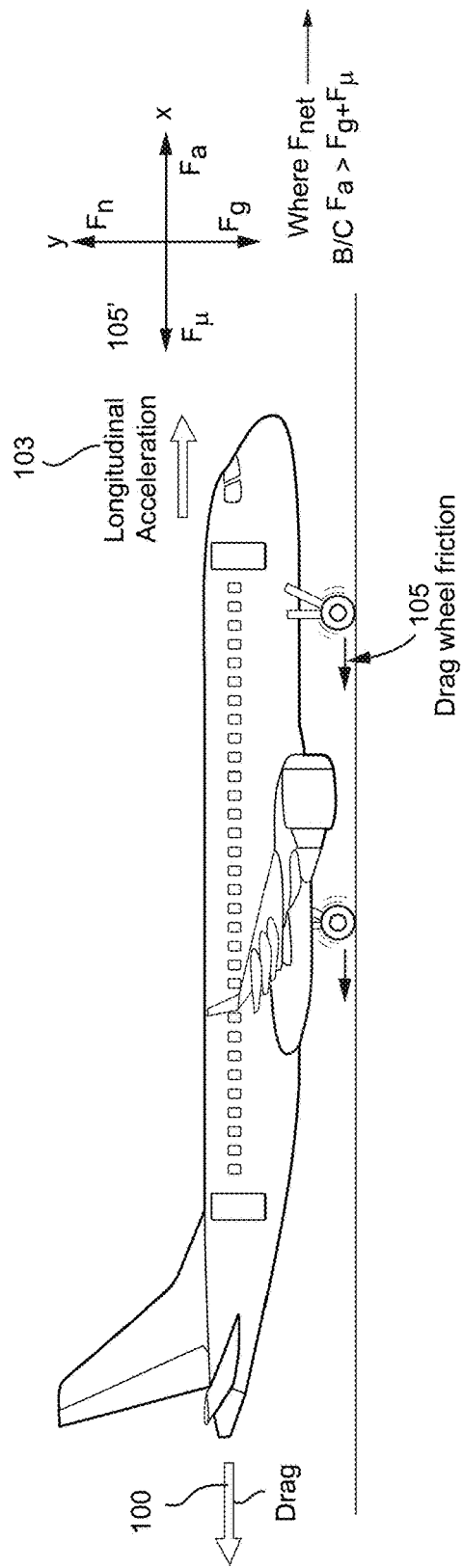
FIG. 1 is a non-limiting illustrative embodiment showing forces (e.g., thrust, wheel friction, wheel drag, configuration drag, etc.) and a resulting longitudinal acceleration that an aircraft incurs during takeoff.

FIG. 1 shows forces including drag 100 and wheel friction 105 that an aircraft typically experiences during the takeoff phase of flight. The Figure shows an aircraft moving down a runway at a longitudinal acceleration that is determined in accordance with F=ma, where F are the forces being exerted on the aircraft, m is the mass of the aircraft, and a is the acceleration.

The mass a is determined based on the total weight of the aircraft, including the aircraft itself, fuel, passengers, baggage and cargo.

The force F on the aircraft has several components. One component is the amount of thrust produced by the engines. Another component is the friction and drag exerted on the aircraft. Drag is defined as the resistance that opposes the direction 103 that an aircraft is moving.

Graphic 105' is a free-body-diagram used to show that the force related to forward acceleration ($F_a$) is greater than all other forces involved in the aircraft's takeoff phase. Such other forces include the force of gravity ($F_g$) that is pulling the aircraft towards the ground, the force of friction ($F_\mu$) (opposite to the direction of aircraft movement) and the normal force ($F_n$), which are responsible for the drag that the aircraft incurs during takeoff.

There are many factors that affect the magnitude of the drag force 100 including the aerodynamic shape of the aircraft (including its current configuration, such as the position of the flaps), the viscosity of the air (which depends on air temperature and altitude), and the velocity of the aircraft. All of the individual components of drag are combined into a single aircraft drag magnitude.

Rolling friction 105 is the resistive force that slows down the motion of a rolling wheel. It is also called rolling resistance.

Once a wheel is rolling, the resistance to the motion is typically a combination of several friction forces at the point of contact between the wheel and the ground or other surface. This assumes the brakes are off—since the brakes are designed to increase rolling friction. The amount of rolling friction depends on several factors including the weight of the aircraft (since the weight exerts a downward force on the wheels that increase the friction coefficient), the inflation and type of tires, and the composition of the runway surface.

One of the insights provided by the present non-limiting technology: the longitudinal acceleration can be directly measured using an inertial sensor, and used as a check against the weight and associated parameters calculated by the flight engineer/dispatch.

Figure 2:
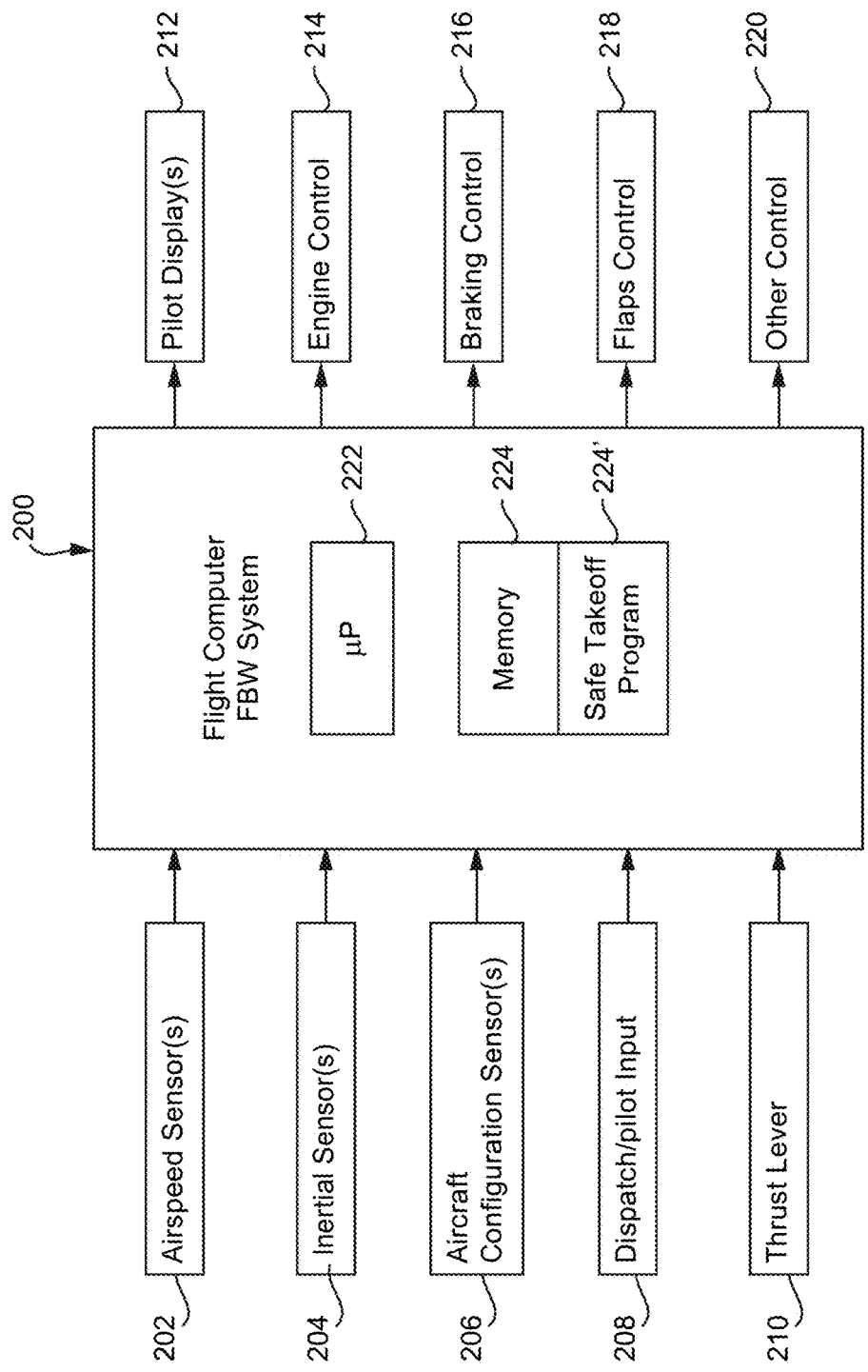
FIG. 2 is an example schematic block diagram of an example non-limiting safe takeoff system for conditionally automatically rejecting takeoff.

FIG. 2 illustrates schematic logic following the flight computer 200 to decide whether to reject takeoff. The flight computer/fly-by-wire (FBW) controller 200 is in this case comprised of at least one processor 222, a memory 224, and a safe takeoff program 224'. It is configured to automatically and autonomously reject takeoff under certain criteria. The flight computer 200 determines takeoff rejection by processing various takeoff parameters including:

signals from the airspeed sensor(s) 202,
signals from inertial sensor(s) 204,
signals from aircraft configuration sensor(s) 206,
dispatch/pilot input 208, and
thrust lever 210 selection.

Flight computer 200 conditionally outputs:
a signal to the pilots' display 212 (e.g., PDF, EICAS),
a signal to the engine control 214,
a signal to the braking control 216,
a signal to the flaps control 218, and
signals to other control(s) 220.

In appropriate cases, the flight computer 200's output signals command the aircraft automatically execute an RTO by reducing or reversing thrust, applying brakes, increasing drag by controlling flaps down, and decelerate safely to a stop.

In determining whether to execute an RTO, the flight computer 200 is able to determine whether the operational procedures of the aircraft during takeoff are either safe or unsafe. The operational procedures during takeoff are defined by the input takeoff parameters. A safe takeoff involves agreement between (a) estimated longitudinal acceleration calculated based on presumed weight of the aircraft, and (b) current actual acceleration as measured by an inertial sensor. An unsafe set of parameters, which leads to a rejection of takeoff, is detected based on an incongruence in the comparison of the estimated longitudinal acceleration and the current measured acceleration.

However, not all such incongruences are the basis for an automatic RTO in the example non-limiting embodiments. In particular, the example non-limiting embodiment flight computer 200 also determines whether an RTO can be safely executed. It is well known that RTO's at high speeds approaching or exceeding V1 can be dangerous. Therefore, the example non-limiting embodiment will only perform an automatic RTO if the measured speed of the aircraft is within a safe range.

If an incongruence is detected, the flight computer 200 executes the rejection of takeoff by displaying on the cockpit that the system has decided to reject takeoff, while reducing the thrust of the aircraft, activating the wheel brakes, and controlling the aerodynamic surfaces (e.g., raising spoilers, lowering flaps, etc.) in order to increase drag to try and bring the aircraft to a safe stop.

Figure 3:
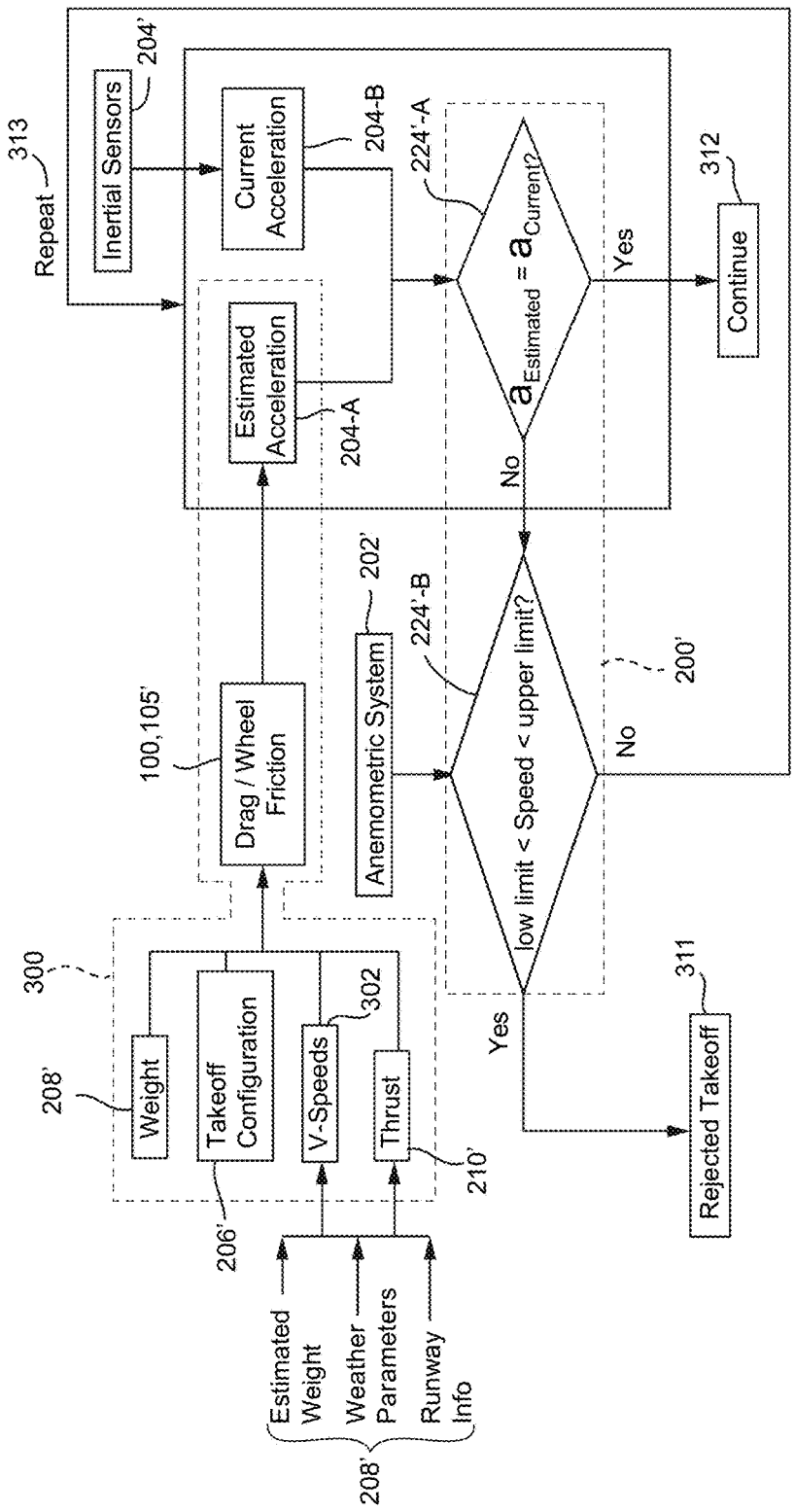
FIG. 3 schematically shows an example non-limiting data evaluation and system decision process.

FIG. 3 depicts a non-limiting example data evaluation and system decision process. In response to estimated weight 208' provided by the flight engineer/dispatch system, weather parameters 208' (e.g., temperature, wind, etc.) and airport data 208' (runway information), a computer (either the flight computer 200 on board the aircraft, a ground computer at dispatch, or some other computer) is configured to calculate the thrust 210' and V-speeds 302 that should be applied during a takeoff procedure. V-speeds or Velocity-speeds are well-known conventional velocity terms used to define critical airspeeds for the operational procedures of aircraft.

$V_1$ is the so called "decision point"—namely the maximum speed during takeoff at which a pilot can safely execute an RTO without overrunning the runway. $V_2$ is defined as the takeoff safety speed. And $V_R$ is the rotation speed, the speed at which the pilot may rotate the aircraft so its nosewheel leaves the ground and it begins to climb into the air.

Based on these same parameters inputted into the dispatch computer 300, (weight 208', takeoff configuration 206', V-speeds 302, and thrust 210') it is also possible to estimate the aircraft's drag 100 and wheel friction forces 105. By estimating thrust 210', drag 100', and wheel friction forces 105' it is possible to estimate a longitudinal acceleration value 204-A of the aircraft based on the dispatch information. This estimated acceleration value can be checked to measured acceleration 204-B that is obtained from the inertial sensor(s) 204' of the aircraft as the aircraft accelerates down the runway.

In simple terms, if the measured acceleration differs significantly from the estimated acceleration, then the actual weight of the aircraft is likely not the same as the estimated weight used to calculate the estimates acceleration. F=ma can be rewritten as a=F/m. So for the equation:

$$F/m_{estimated} \stackrel{?}{=} a_{measured}$$

if the estimated mass (m) very wrong, then the measured acceleration will not match the estimated acceleration calculated based on the estimated mass.

In the example shown, the expected longitudinal acceleration value 204-A and the measured acceleration value 204-B are compared in the flight computer 200' of the aircraft as the aircraft begins moving down the runway. This is in the nature of a physics experiment with practical consequences: if the flight computer 200 determines that the two acceleration values are consistent, then normal takeoff procedure 312 is followed and no intervention is required. However, if the flight computer 200' determines that the two acceleration values are not consistent, then there is a problem. Specifically, the estimated weight of the aircraft has been experimentally determined to be incorrect. The pilot is notified of this discrepancy; and in the example non-limiting embodiment, the flight computer 200 autonomously performs an RTO if it is safe to do so.

To determine safety of an RTO, the safe takeoff program 224'-B in one example non-limiting embodiment is configured to determine whether the aircraft's speed 202' is inside a safe "speed window". Therefore, for example, takeoff rejection 311 is conditioned on whether the measured speed of the aircraft is below a safe stopping speed. If the aircraft is within the safe speed window, then the flight computer 200' automatically aborts the takeoff 311. On the other hand, if the aircraft speed is outside the defined margin of a safe stopping speeds, then the safe takeoff program 224'-B is configured to repeat 313 the comparison of the acceleration values while potentially also warning the pilot that something may be wrong.

In one example non-limiting embodiment, the entire process is transparent to the pilot. The pilot does not need to perform any procedure. This will reduce the pilot's workload in a very demanding flight phase, as well as to produce a more consistent operation.

The new non-limiting technology herein thus proposes a system that automatically rejects or aborts takeoff if erroneous takeoff parameters or data are detected. In order to prevent a runway excursion or overrun, the rejected takeoff shall occur only in a well-defined "speed window" between a Lower limit speed and an upper limit speed, where:

Lower Limit Speed: Below this value, the anemometric system is not capable of estimating the speed of the aircraft with a necessary accuracy.

Upper Limit Speed: Up to this speed, it is possible to guarantee that the aircraft can safely abort the takeoff without the risk of a runway excursion or overrun. In layman's terms, this means a low kinetic energy rejected takeoff.

Figure 4A:
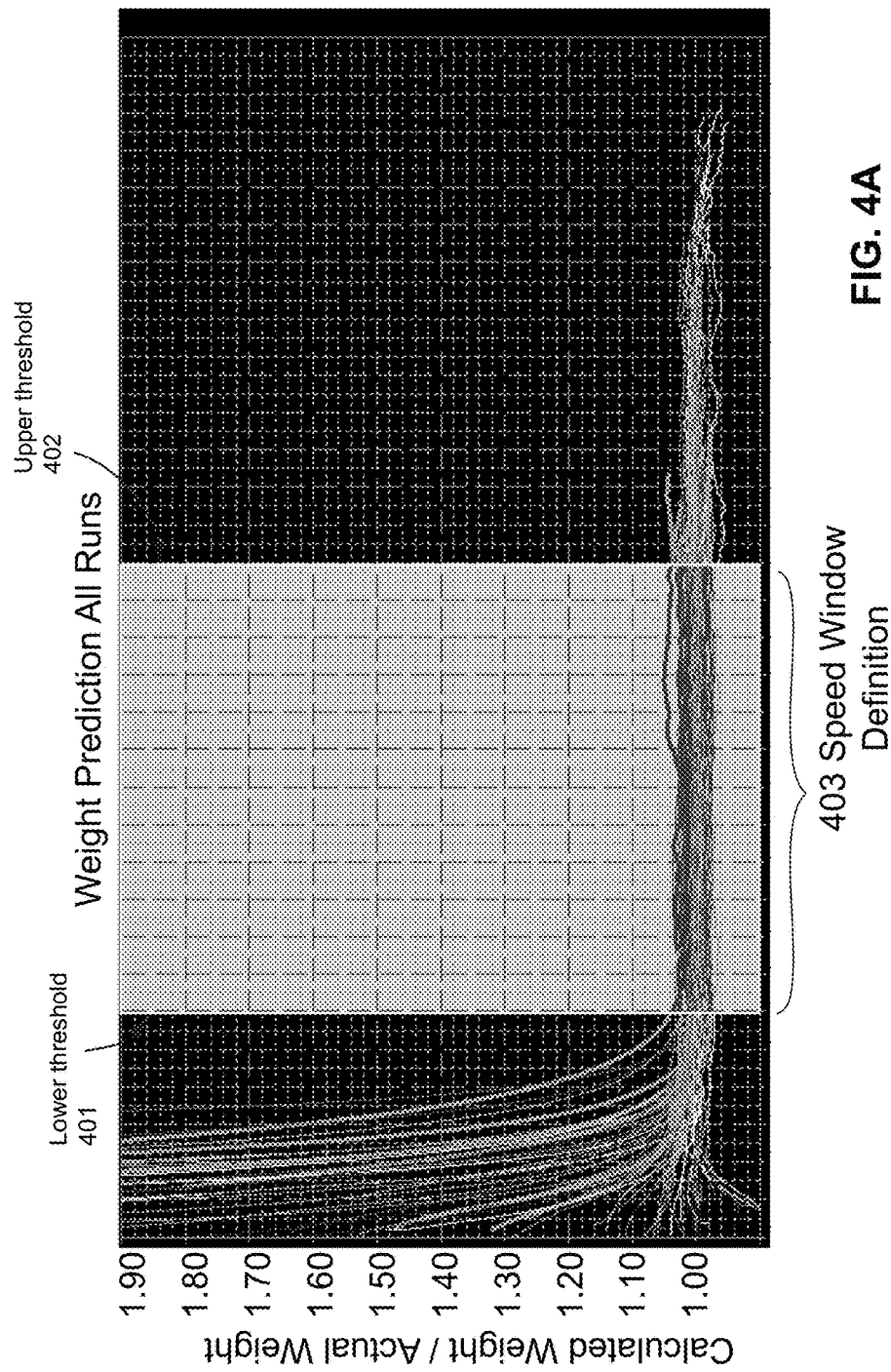
FIG. 4A illustrates an example non-limiting definition of a safe speed window based on ratios of actual vs. predicted aircraft weight, the window providing an upper threshold and a lower threshold.

FIG. 4A depicts a graph wherein the concept of a "speed window" is defined. The speed window 403 is a margin, bounded by an upper threshold 402 and a lower threshold 401. The lower threshold 401, referred to as the Lower Limit Speed ("LLS"), is the specific value where any airspeed below this limit is unmeasurable by the anemometric system due to the fact that the aircraft is not moving fast enough. In the same manner, the upper threshold 402, referred to as the Upper Limit Speed ("ULS"), is the limit that guarantees a safe rejection of takeoff without the risk of a runway excursion. Although the graph compares the ratio of calculated and actual weight, acceleration should be the parameter compared, but weight and acceleration are correlated and the final effect is similar.

FIG. 4B considers a non-limiting embodiment of a "speed window", that has a:

Lower Limit: Typically, this value should be around 30 to 50 knots, preferably around 30-40 knots.

Upper Limit: This speed should be in the order of 70 to 100 knots, preferably around 80-100 knots.

In the non-limiting example, with the speed window considered, it is not necessary to estimate the remaining distance on the runway, since with low energy the aircraft will be capable to abort the takeoff in any runway that it can be dispatched to.

It should be noted that the safety aspect of the safe speed window results from the upper speed limit. In the example embodiment, the lower speed limit is used merely to ensure that the measured aircraft speed is accurate. As is well known, typical anemometric speed sensors do not begin providing valid speed data until the aircraft is moving at above a minimum speed. However, there are other known ways to measure aircraft speed such as GPS, and the particular nature of the low speed threshold (or if any is applied) may depend on the type of speed sensor(s) being used.

However, it can be seen from FIGS. 4A and 4B that for a wide range of estimated to actual weight values, the resulting speed data statistically converge at above a low speed threshold. This is because for a given thrust, the rate of change of velocity depends on weight. This means that above a low speed threshold, the same procedure can be applied to a wide variety of weight discrepancies to result in a valid test.

Figure 5:
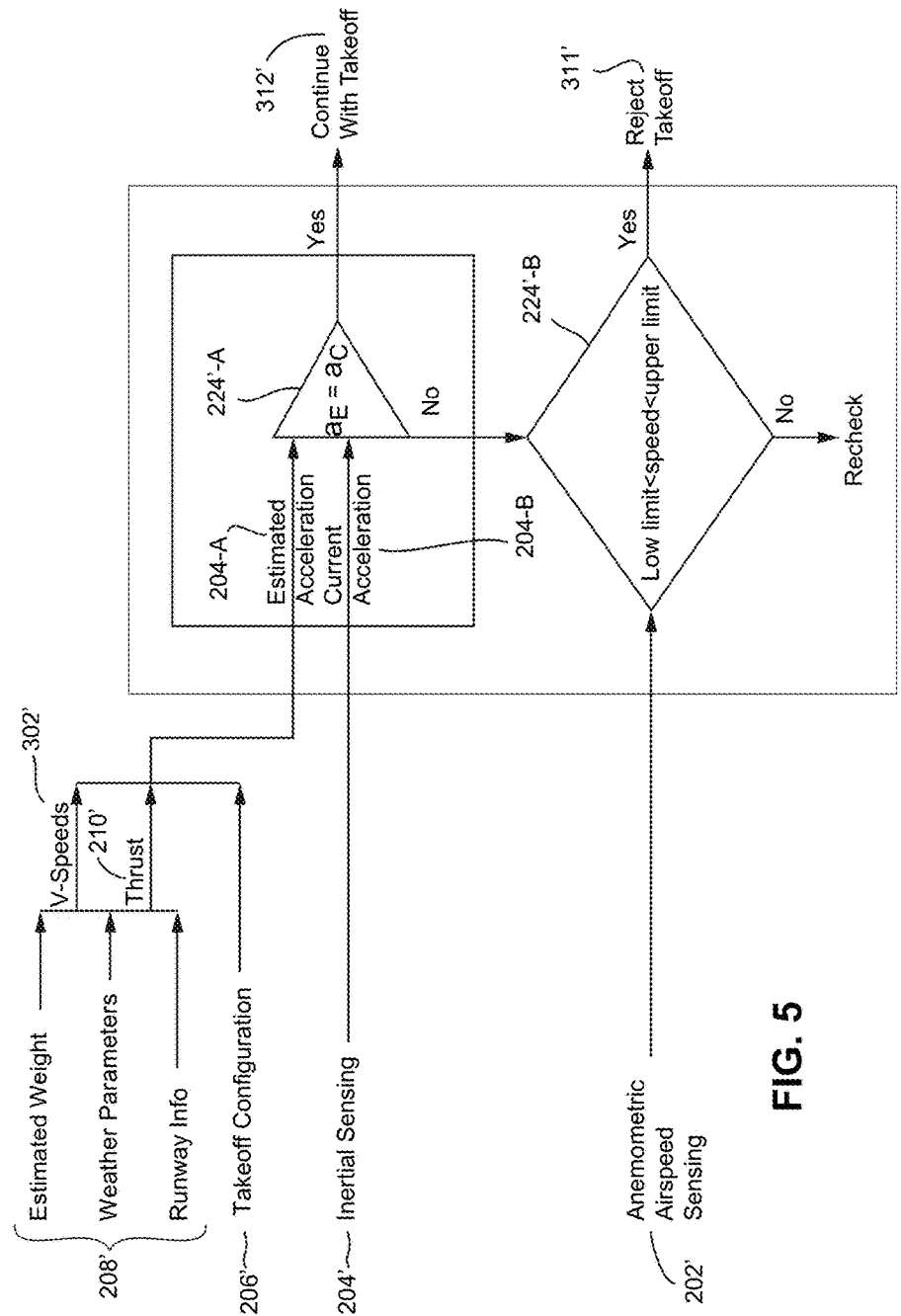
FIG. 5 illustrates signal flow of an example non-limiting embodiment of an automatic takeoff rejection system.

FIG. 5 illustrates example non-limiting signal flow of the aircraft's auto rejection system. The system is configured to receive dispatch data (e.g., estimated weight 208', weather parameters 208', runway info 208', takeoff configuration 206', etc.) from the ground computer. Among the parameters calculated by the dispatch computer 300' using the dispatch data are V-speeds (e.g., $V_1$, $V_R$, $V_2$), and thrust lever 210 selection. As explained before, with these parameters inputted into the dispatch computer 300 it is also possible to estimate the aircraft's drag 100' and wheel friction forces 105'. With drag 100' and wheel friction forces 105' calculated, it is possible to estimate a longitudinal acceleration value 204-A. This estimated acceleration value can be compared 224'-A to measured acceleration 204' that is obtained from the inertial sensor(s) 204'.

If the measured and estimated acceleration values match within a certain tolerance, then normal takeoff procedure 312' is followed from the safe takeoff program 224'-A. However, if the flight computer 200' determines that the acceleration values are very different, then the safe takeoff program 224'-B is configured to determine whether the aircraft's speed 202' is inside a safe "speed window". If the aircraft is within the speed window, then the flight computer 200' automatically aborts the takeoff 311' and autonomously performs an RTO. On the other hand, if the measured speed of the aircraft is outside of the safe speed window, then the safe takeoff program 224'-B is configured to take no action and repeat 313' the comparison of the acceleration values.

Figure 6A:
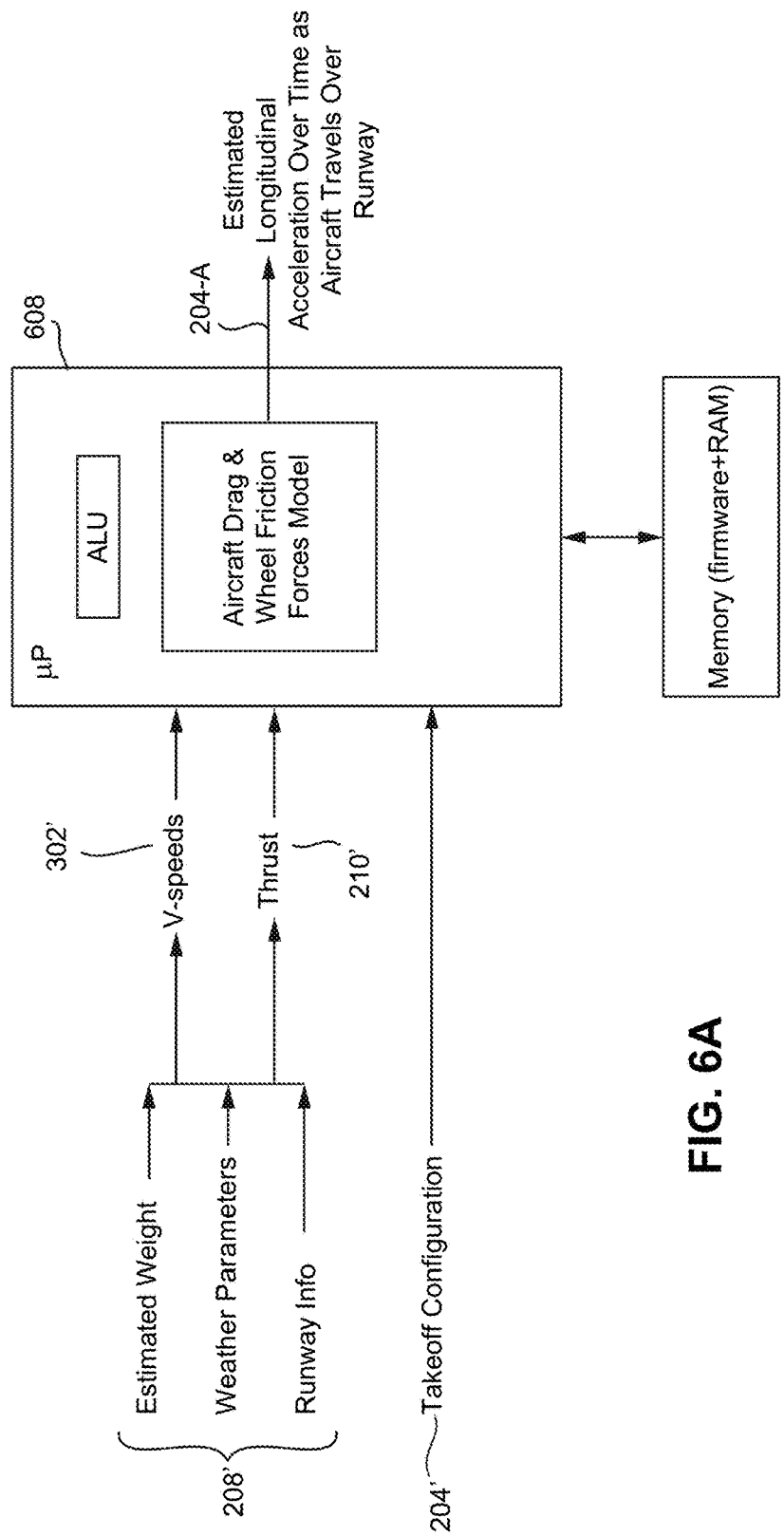
FIG. 6A illustrates how estimated longitudinal acceleration can be calculated.

FIG. 6A shows a non-limiting means that can be used by the aircraft to calculate the estimated longitudinal acceleration. Some inputs used to calculate the estimated longitudinal 610 acceleration come from different sensors or state information that indicate aircraft takeoff configuration 206' (e.g., flap/slat configuration). Other input parameters (the ones to be tested) are obtained from dispatch, such parameters including estimated weight 208'. Dispatch also supplies additional information such as weather 208' (including air density), runway info 208', etc.). Criteria such as V-speeds 302' and thrust settings 210' are calculated using such inputs (e.g., estimated weight 208', weather 208', runway information 208', etc., as explained above). All inputs are processed by a processing unit (e.g., microprocessor) 608 in the aircraft's flight computer 200' and/or by the ground computer or some other computer. The processing unit is able to calculate the aircraft's drag and wheel friction forces, making it possible to estimate the longitudinal acceleration of the aircraft 204-A.

Figure 6B:
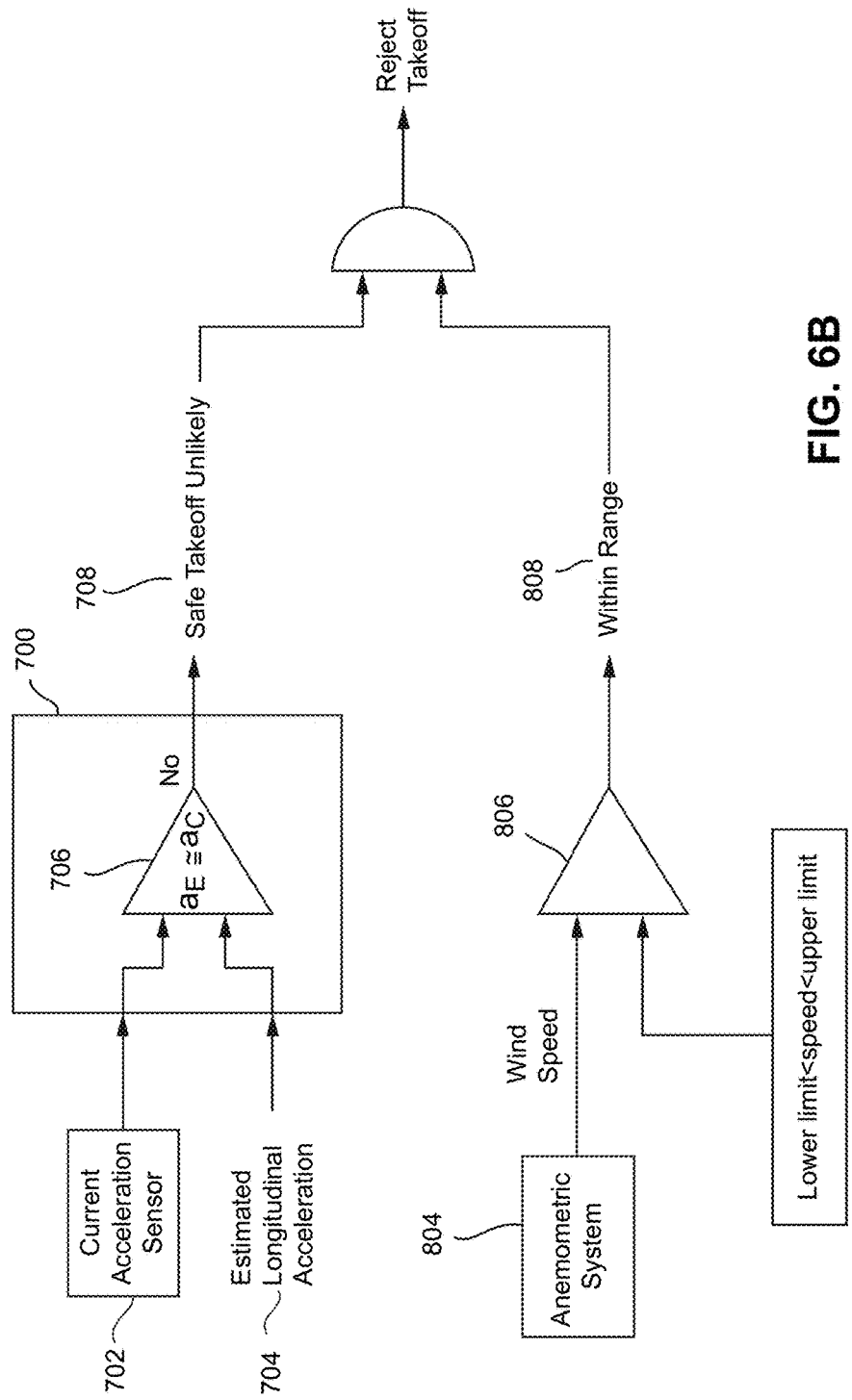
FIG. 6B shows example non-limiting automatic takeoff rejection decision logic.

FIG. 6B illustrates an example non-limiting means of determining takeoff rejection by comparing the estimated longitudinal acceleration with the measured acceleration, and determining whether the aircraft is moving at a safe stopping speed. Such logic can be implemented in a variety of ways such as by a software controlled process, a gate/logic array, or any other suitable implementation. The estimated longitudinal acceleration signal 704 and the measured acceleration signal 702 are received by a subprocessing unit 700 in the flight computer 200'. The flight computer is configured to receive both acceleration values and compare them using a comparator 706. Comparator 706 determines whether to output a safe takeoff signal 312' (meaning that both accelerations are substantially equal) or send a signal 708 to a structural and/or software based logic to check whether it is safe to reject takeoff.

Concurrently, the anemometric system 804 measures wind speed to determine whether the aircrafts' speed is within a range defined by a safe speed window. The anemometric system 804 measures the speed of the wind relative to the aircraft and thus the speed of the aircraft (once wind speed and direction is taken into account). The anemometric system 804 outputs a measurement value to comparator 806, which determines whether the measured wind speed value is between the lower limit and the upper limit defined by the speed window. If the measured value is within the range defined between the limits, then a signal 808 is sent to the structural and/or software based logic AND gate.

The structural and/or software based logic AND gate is configured to follow the Boolean logic of an AND gate, meaning that both conditions must be true in order for the gate to generate a true output. Positive or negative logic (e.g., NAND) can be used in a well-known manner. For the system to execute the automatic takeoff rejection, both discrepancy in acceleration values and airspeed within designated speed window, must be true.

Figure 7:
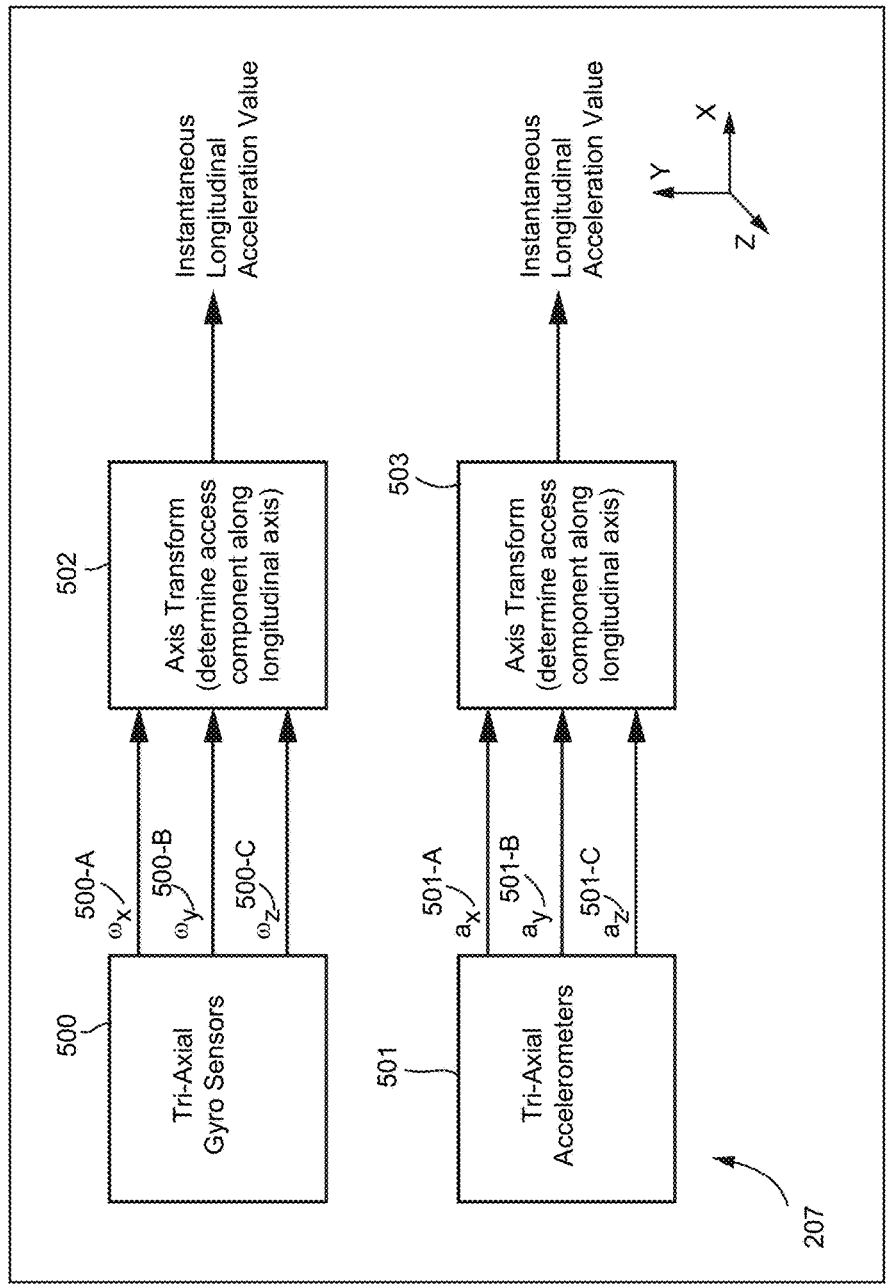
FIG. 7 illustrates how current acceleration may be measured/determined.

FIG. 7 illustrates a non-limiting example of how an aircraft's inertial sensors 204' can be used to measure longitudinal acceleration. Generally speaking, inertial sensors are devices designed to measure inertial values such as acceleration and rotation. Examples of inertial sensors include gyrosensors 500 and accelerometers 501.

There are many types of accelerometers 501, such as mechanical accelerometers that consists of devices that measures the displacement of an inertial mass suspended by a spring. Another type of accelerometer is the surface acoustic wave (SAW) accelerometer which consists of a cantilever beam which resonates at a particular frequency, when acceleration is applied the beam bends changing the frequency, the change in frequency can be used to determine the acceleration. Yet another type of accelerometer is the MEMS accelerometers that uses capacitance to measure displacement of a minute mass floating on springs.

There are many different varieties of gyrosensors, such as mechanical, optical, and MEMS. Mechanical gyroscopes often used in the aircraft industry to determine aircraft attitude during flight consist of a spinning wheel mounted on two gimbals which allow the wheel to rotate in all three axes. Optical gyroscopes (e.g., fiber optic gyroscopes "FOG") use the interference of light to measure angular velocity. A MEMS gyrosensor usually contains a vibratory elements to measure the Coriolis effect. For example, a single mass which is driven to vibrate along a drive axis. When the gyroscope is rotation a secondary vibration is induced along the perpendicular axis due to the Coriolis force. The angular velocity or rate output by such a system indicates the rate of change of attitude. This can be differentiated to determine acceleration.

Such devices can have any number of axes, including triaxial meaning that they measure all three degrees of freedom. Once such inertial values are sensed, they can be processed using conventional matrix multiplication to determine the component of acceleration in any desired particular direction.

Inertial sensors 500, 501 are thus able to measure inertial values such as the angular velocities ($\omega_x$ 500-A, $\omega_y$ 500-B, $\omega_z$ 500-C) via the gyroscopes 500, and the accelerations ($a_x$ 501-A, $a_y$ 501-B, $a_z$ 501-C) via the accelerometers 501. Appropriate conventional axes transformations (which also involve knowing the orientation of the measured axes to the physical longitudinal centerline of the aircraft) can be used to calculate current longitudinal acceleration of the aircraft.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. On an aircraft, a system comprising:
at least one inertial sensor producing a first signal;
at least one wind speed sensor producing a second signal; and
at least one flight computer, operatively coupled to the at least one inertial sensor and the at least one wind speed sensor, the at least one flight computer configured to:
measure an acceleration in response to the first signal;
compare the measured acceleration with an expected acceleration value;
determine whether the measured acceleration differs significantly from the expected acceleration value;
in response to the second signal, determine whether the aircraft is operating below an upper limit speed guaranteeing the aircraft can safely perform a low kinetic energy rejected takeoff without the risk of a runway excursion or overrun; and
if the measured acceleration is determined to different significantly from the expected acceleration value and the aircraft is determined to be operating below the upper limit speed, automatically issue control signals to automatically abort takeoff conditioned on both the comparison and the speed determination, the control signals controlling the aircraft to automatically execute a rejected takeoff by reducing or reversing thrust, applying brakes, and increasing drag by controlling aerodynamic control surfaces to bring the aircraft to a safe stop.

2. The system of claim 1, wherein the inertial sensor comprises an accelerometer.

3. The system of claim 1, wherein the inertial sensor comprises a gyro-sensor.

4. The system of claim 1, wherein the wind speed sensor comprises an anemometer.

5. The system of claim 1, further including a sensor configured to measure parameters indicative of aircraft configuration.

6. The system of claim 1, wherein the at least one flight computer determines the acceleration in response to the first signal indicating at least one parameter indicative of inertial movement.

7. The system of claim 1, wherein the at least one flight computer is configured to calculate the expected acceleration value in response to the aircraft weight, and takeoff configuration.

8. The system of claim 1, wherein the at least one flight computer uses the comparison to automatically reject takeoff due to discrepancy between programmed and actual takeoff parameters including weight.

9. The system of claim 1, wherein the at least one flight computer further comprises:
at least one processor configured to automatically:
a) process the first signal and compute in response thereto a current acceleration;
b) compare expected longitudinal acceleration value and the current acceleration to predict whether the aircraft is unable to take off safely using programmed takeoff parameters; and
c) determine if the aircraft is operating below a safe speed upper limit and is therefore able to perform a safe RTO.

10. A system for monitoring the safe takeoff of an aircraft, comprising:
at least one inertial sensor producing a signal; and
at least one flight computer, operatively coupled to the at least one inertial sensor, configured to:
a) measure an acceleration in response to the signal;
b) compare the measured acceleration with an expected acceleration value based on programmed aircraft configuration including weight; and
c) if the measured acceleration value differs significantly from the expected acceleration value and the at least one flight computer determines the aircraft is operating below an upper limit speed guaranteeing the aircraft can safely perform a low kinetic energy rejected takeoff without the risk of a runway excursion or overrun, automatically issue control signals to automatically abort takeoff, the control signals controlling the aircraft to reduce or reverse thrust, apply brakes, and/or increase drag by controlling aerodynamic control surfaces to bring the aircraft to a safe stop.

11. A system for monitoring safe takeoff of an aircraft, comprising:
at least one wind speed sensor producing a speed signal;
an inertial sensor; and
at least one flight computer, operatively coupled to the at least one wind speed sensor and the inertial sensor, the at least one flight computer being programmed with takeoff velocity speeds, the at least one flight computer configured to:
a) based on sensing by the inertial sensor, determine whether the programmed takeoff velocity speeds are unreliable;
b) determine, in response to the speed signal, whether the aircraft is operating below an upper limit speed guaranteeing the aircraft can safely perform a low kinetic energy rejected takeoff without the risk of a runway excursion or overrun; and
c) if the at least one flight computer determines the takeoff velocity speeds are unreliable and the aircraft is operating below the upper limit speed, issue control signals to automatically abort takeoff, the control signals controlling the aircraft to reduce or reverse thrust, apply brakes, and/or increase drag by controlling aerodynamic control surfaces, to bring the aircraft to a safe stop.

12. An aircraft, comprising:
at least one inertial sensor producing a first signal;
at least one wind speed sensor producing a second signal;
at least one flight computer, operatively coupled to the at least one inertial sensor and the at least one wind speed sensor, the at least one flight computer configured to:
a) measure an acceleration in response to the first signal;
b) compare the measured acceleration with an estimated acceleration value to determine whether the measured acceleration indicates that unreliable takeoff velocity speeds have been programmed into the at least one flight computer;
c) determine, in response to the second signal, whether the aircraft is operating below an upper limit speed guaranteeing the aircraft can safely perform a low kinetic energy rejected takeoff without the risk of a runway excursion or overrun; and
d) issue control signals to automatically abort takeoff conditioned on both the comparison and the speed determination without limitation by the programmed unreliable takeoff velocity speeds, the control signals controlling the aircraft to reduce or reverse thrust, apply brakes, and/or increase drag by controlling aerodynamic control surfaces, to bring the aircraft to a safe stop.

13. The aircraft of claim 12, wherein the inertial sensor comprises an accelerometer.

14. The aircraft of claim 12, wherein the inertial sensor comprises a gyro-sensor.

15. The aircraft of claim 12, wherein the wind speed sensor comprises an anemometer.

16. The aircraft of claim 12, further including at least a sensor configured to measure a parameter indicative of aircraft configuration.

17. The aircraft of claim 12, wherein the at least one flight computer measures acceleration in response to the first signal indicating inertial movement of the aircraft.

18. The aircraft of claim 12, wherein the at least one flight computer is configured to calculate the expected estimated acceleration value by processing the aircraft weight and takeoff configuration.

19. The aircraft of claim 12, wherein the at least one flight computer uses the comparison to automatically reject takeoff due to discrepancy between programmed takeoff parameters and measured aircraft performance.

20. The aircraft of claim 12, wherein the at least one flight computer further comprises:
at least one processor configured to automatically:
a) process the first signal and compute in response thereto an acceleration;
b) compare expected estimated longitudinal acceleration and the computed acceleration; and
c) determine if the aircraft is within the upper bounds of a safe speed to perform a safe RTO.

21. A method of automatically rejecting takeoff comprising:
a) measuring acceleration in response to an inertial sensing signal;
b) comparing the measured acceleration with an acceleration value calculated based on programmed aircraft configuration;
c) determining, in response to a speed signal, whether the aircraft is operating within a safe speed guaranteeing the aircraft can safely perform a low kinetic energy rejected takeoff without the risk of a runway excursion or overrun; and
d) conditioned on both the comparison and the safe speed determination, issuing control signals to automatically abort takeoff without limitation by programmed takeoff velocity speeds, the control signals controlling the aircraft to reduce or reverse thrust, apply brakes, and/or increase drag by controlling aerodynamic control surfaces.

22. The method of claim 21, further including deriving the expected acceleration value from the estimated aircraft weight and takeoff configuration.

23. The method of claim 21, further including deriving safe speed bounds of lower and upper limits of favorable aircraft speeds.

24. A method of automatically rejecting takeoff, the method comprising:
measuring acceleration in response to a signal;
comparing the measured acceleration with an expected acceleration value based on programmed aircraft weight;
determining, in response to a speed signal, whether an aircraft is operating within a safe speed guaranteeing the aircraft can safely perform a low kinetic energy rejected takeoff without the risk of a runway excursion or overrun; and
conditioned on the comparison and the determination, issuing control signals to automatically abort takeoff without being bound by takeoff velocity speeds based on said programmed aircraft weight, the control signals controlling the aircraft to reduce or reverse thrust, apply brakes, and/or increase drag by controlling aerodynamic control surfaces.

25. The method of claim 24, further including producing the signal by inertial sensor(s).

26. The method of claim 24, further including producing the expected acceleration value from the estimated weight of aircraft and takeoff configuration.

27. A method of automatically rejecting takeoff, the method comprising:
determining, in response to a speed signal, whether the aircraft is operating within a safe speed window guaranteeing the aircraft can safely perform a low kinetic energy rejected takeoff without the risk of a runway excursion or overrun;
measuring inertial response of the aircraft;
comparing the measured inertial response with an inertial response predicted based on programmed aircraft weight; and
if the comparison reveals the measured inertial response differs significantly from the predicted inertial response and the determining reveals the aircraft is operating within the safe speed window, issuing control signals to automatically abort takeoff.

28. The method of claim 27, further including producing the speed signal using wind speed sensor(s).

29. The method of claim 27, wherein said safe speed window is defines lower and upper limits of aircraft speeds.

* * * * *